US010929142B2

(12) United States Patent
Alexander et al.

(10) Patent No.: US 10,929,142 B2
(45) Date of Patent: Feb. 23, 2021

(54) MAKING PRECISE OPERAND-STORE-COMPARE PREDICTIONS TO AVOID FALSE DEPENDENCIES

(71) Applicant: International Business Machines Corporation, Armonk, NY (US)

(72) Inventors: Gregory William Alexander, Pflugerville, TX (US); James Bonanno, Wappingers Falls, NY (US); Adam Collura, Hopewell Junction, NY (US); James Raymond Cuffney, Poughkeepsie, NY (US); Yair Fried, Petah Tiqwa (IL); Jonathan Hsieh, Poughkeepsie, NY (US); Jang-Soo Lee, Poughkeepsie, NY (US); Edward Malley, New Rochelle, NY (US); Anthony Saporito, Highland, NY (US); Eyal Naor, Tel-Aviv (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 33 days.

(21) Appl. No.: 16/358,791

(22) Filed: Mar. 20, 2019

(65) Prior Publication Data

US 2020/0301710 A1    Sep. 24, 2020

(51) Int. Cl.
*G06F 9/38* (2018.01)
*G06F 9/30* (2018.01)

(52) U.S. Cl.
CPC ........ *G06F 9/3838* (2013.01); *G06F 9/30043* (2013.01); *G06F 9/383* (2013.01); *G06F 9/3836* (2013.01); *G06F 9/3844* (2013.01)

(58) Field of Classification Search
None
See application file for complete search history.

(56) References Cited

U.S. PATENT DOCUMENTS 5,615,350 A * 3/1997 Hesson ............... G06F 9/383
                                                  711/E12.02
5,987,595 A * 11/1999 Yoaz .................. G06F 9/383
                                                  712/216

(Continued)

FOREIGN PATENT DOCUMENTS

| JP | 11167516 A | * | 6/1999 |
| WO | 2011076602 A1 | | 6/2011 |
| WO | 2013165754 A1 | | 11/2013 |

OTHER PUBLICATIONS

'Memory Dependence Prediction' by Andreas Ioannis Moshovos, dissertation, University of Wisconsin—Madison 1998. (Year: 1998).*

(Continued)

*Primary Examiner* — Steven G Snyder
(74) *Attorney, Agent, or Firm* — Cantor Colburn LLP; William Kinnaman

(57) ABSTRACT

Provided are embodiments including a computer-implemented method, system and computer program product for determining precise operand-store-compare (OSC) predictions to avoid false dependencies. Some embodiments include detecting an instruction causing an OSC event, wherein the OSC event is at least one of a store-hit-load event or a load-hit-store event, marking an entry in a queue for the instruction based on the detected OSC event, wherein marking the entry comprises setting a bit and saving a tag in the entry in the queue. Some embodiments also include installing an address for the instruction and the tag in the history table responsive to completing the instruction.

19 Claims, 10 Drawing Sheets

(56) References Cited

U.S. PATENT DOCUMENTS

| | | | | |
|---|---|---|---|---|
| 6,108,770 | A * | 8/2000 | Chrysos | G06F 9/30043 |
| | | | | 712/216 |
| 6,415,380 | B1 * | 7/2002 | Sato | G06F 9/3834 |
| | | | | 711/137 |
| 6,622,237 | B1 * | 9/2003 | Keller | G06F 9/3834 |
| | | | | 712/214 |
| 6,651,161 | B1 * | 11/2003 | Keller | G06F 9/3834 |
| | | | | 712/216 |
| 6,694,424 | B1 * | 2/2004 | Keller | G06F 9/3834 |
| | | | | 712/216 |
| 7,062,638 | B2 * | 6/2006 | Yoaz | G06F 9/3834 |
| | | | | 712/216 |
| 7,290,121 | B2 | 10/2007 | Kromer | |
| 7,415,597 | B2 * | 8/2008 | Filippo | G06F 9/3838 |
| | | | | 712/216 |
| 7,461,238 | B2 * | 12/2008 | Luick | G06F 9/3853 |
| | | | | 712/216 |
| 7,603,527 | B2 * | 10/2009 | Hily | G06F 9/3824 |
| | | | | 711/158 |
| 7,730,283 | B2 * | 6/2010 | Luick | G06F 9/30185 |
| | | | | 712/216 |
| 7,975,130 | B2 | 7/2011 | Alexander et al. | |
| 8,195,924 | B2 | 6/2012 | Alexander et al. | |
| 9,244,827 | B2 * | 1/2016 | Kim | G06F 12/0215 |
| 9,262,171 | B2 * | 2/2016 | Golla | G06F 9/3838 |
| 9,430,235 | B2 | 8/2016 | Alexander et al. | |
| 9,495,156 | B1 * | 11/2016 | Alexander | G06F 9/30021 |
| 9,495,167 | B2 | 11/2016 | Alexander et al. | |
| 9,600,289 | B2 * | 3/2017 | Meier | G06F 9/3838 |
| 9,606,805 | B1 * | 3/2017 | Alexander | G06F 9/3806 |
| 9,619,750 | B2 * | 4/2017 | Kim | G06N 5/04 |
| 9,626,189 | B2 | 4/2017 | Busaba | |
| 9,652,248 | B2 | 5/2017 | Alexander | |
| 9,928,075 | B2 | 3/2018 | Alexander et al. | |
| 10,013,257 | B2 | 7/2018 | Hutton et al. | |
| 10,067,762 | B2 | 9/2018 | Agarwal et al. | |
| 10,073,789 | B2 * | 9/2018 | Chou | G06F 9/3842 |
| 10,152,327 | B2 * | 12/2018 | Zeng | G06F 9/30043 |
| 10,417,002 | B2 * | 9/2019 | Lloyd | G06F 9/3855 |
| 10,579,387 | B2 * | 3/2020 | Gonzalez | G06F 9/3861 |
| 2003/0074530 | A1 * | 4/2003 | Mahalingaiah | G06F 9/3844 |
| | | | | 711/117 |
| 2004/0044881 | A1 * | 3/2004 | Maier | G06F 9/3834 |
| | | | | 712/218 |
| 2006/0095734 | A1 * | 5/2006 | Filippo | G06F 9/3838 |
| | | | | 712/218 |
| 2007/0022277 | A1 * | 1/2007 | Iwamura | G06F 9/3857 |
| | | | | 712/229 |
| 2008/0082765 | A1 * | 4/2008 | Hily | G06F 9/3824 |
| | | | | 711/154 |
| 2008/0276074 | A1 * | 11/2008 | Luick | G06F 9/382 |
| | | | | 712/216 |
| 2010/0332806 | A1 * | 12/2010 | Golla | G06F 9/3851 |
| | | | | 712/216 |
| 2011/0153986 | A1 | 6/2011 | Alexander et al. | |
| 2011/0185158 | A1 | 7/2011 | Alexander et al. | |
| 2013/0326198 | A1 * | 12/2013 | Meier | G06F 9/3834 |
| | | | | 712/216 |
| 2014/0181482 | A1 * | 6/2014 | Smaus | G06F 9/384 |
| | | | | 712/225 |
| 2015/0006452 | A1 * | 1/2015 | Kim | G06F 9/3855 |
| | | | | 706/21 |
| 2015/0089186 | A1 * | 3/2015 | Kim | G06F 12/0215 |
| | | | | 711/213 |
| 2017/0060755 | A1 * | 3/2017 | Chou | G06F 12/0859 |
| 2017/0109170 | A1 | 4/2017 | Alexander et al. | |
| 2017/0286119 | A1 * | 10/2017 | Al Sheikh | G06F 9/3806 |
| 2018/0081686 | A1 | 3/2018 | Ho et al. | |
| 2018/0232234 | A1 | 8/2018 | Alexander et al. | |
| 2019/0108031 | A1 * | 4/2019 | Gonzalez | G06F 9/3826 |
| 2019/0108034 | A1 * | 4/2019 | Lloyd | G06F 9/34 |
| 2019/0310858 | A1 * | 10/2019 | Lloyd | G06F 9/34 |
| 2020/0301710 | A1 | 9/2020 | Cuffney et al. | |

OTHER PUBLICATIONS

'Load-Store Queue Management: an Energy-Efficient Design Based on a State-Filtering Mechanism' by Fernando Castro et al., International Conference on Computer Design, Oct. 2005. (Year: 2005).*

'Streamlining Inter-operation Memory Communication via Data Dependence Prediction' by Andreas Moshovos and Gurindar S. Sohi, copyright IEEE, 1997. (Year: 1997).*

'Improving the Accuracy and Performance of Memory Communication Through Renaming' by Gary S. Tyson et al., copyright 1997, IEEE. (Year: 1997).*

'Store Vectors for Scalable Memory Dependence Prediction and Scheduling' by Samantika Subramaniam Gabriel H. Loh, copyright 2006, IEEE. (Year: 2006).*

Choi et al.; "Improving Value Prediction by Exploiting Both Operand and Output Value" Laboratory for Advanced . . . , 1999—pdfs. semanticscholar.org, 21 pages.

Chrysos et al.; Memory Dependence Prediction Using Store Sets, IEEE, 1998, 12 pages.

Onder et al.; "Dynamic Memory Disambiguation in the Presence of Out-Of-Order Store Issuing", This work was supported by NSF grants CCR-0096122 and EIA-9806525 to The University of Arizona, 1999, 22 pages.

Reinman et al.; "Classifying Load and Store Instructions for Memory Renaming", Published i the Proceedings of the International Conference, Jun. 1999, 10 pages.

Anonymous, "A Method and System for Precise Prediction of OSC Hazards Using Distance Comparison Between Store and Load Instructions," ip.com; IPCOM000234987D. Published Feb. 21, 2014. 4 pages.

Anonymous, "Determining Most of the Non Duplicate Records in High Performance Environments in an Economical and Fault Tolerant Manner," IP.com; IPCOM000207132D. Published May 17, 2011. 28 pages.

Anonymous, "Method of Tracking Pseudo-Dependencies for use in Operand Store Compare Avoidance," IP.com; IPCOM000196518D. Published Jun. 4, 2010. 2 pages.

International Business Machines Corporation, "Method to Exclude Bad Patterns From a Pattern History Table Branch Predictor," IP.com, IPCOM000191968D. Published Jan. 19, 2010. 5 pages.

List of IBM Patents or Patent Applications Treated as Related; Date Filed: Sep. 24, 2020; 2 pages.

* cited by examiner

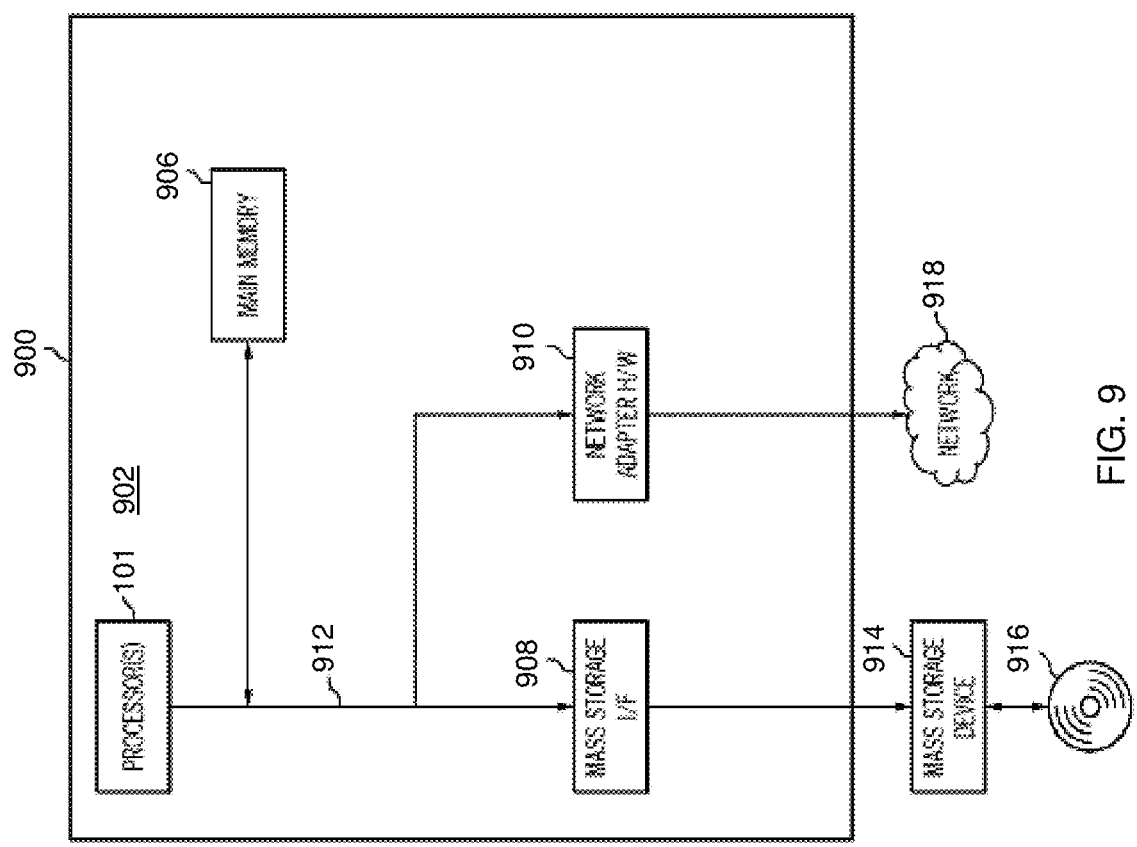

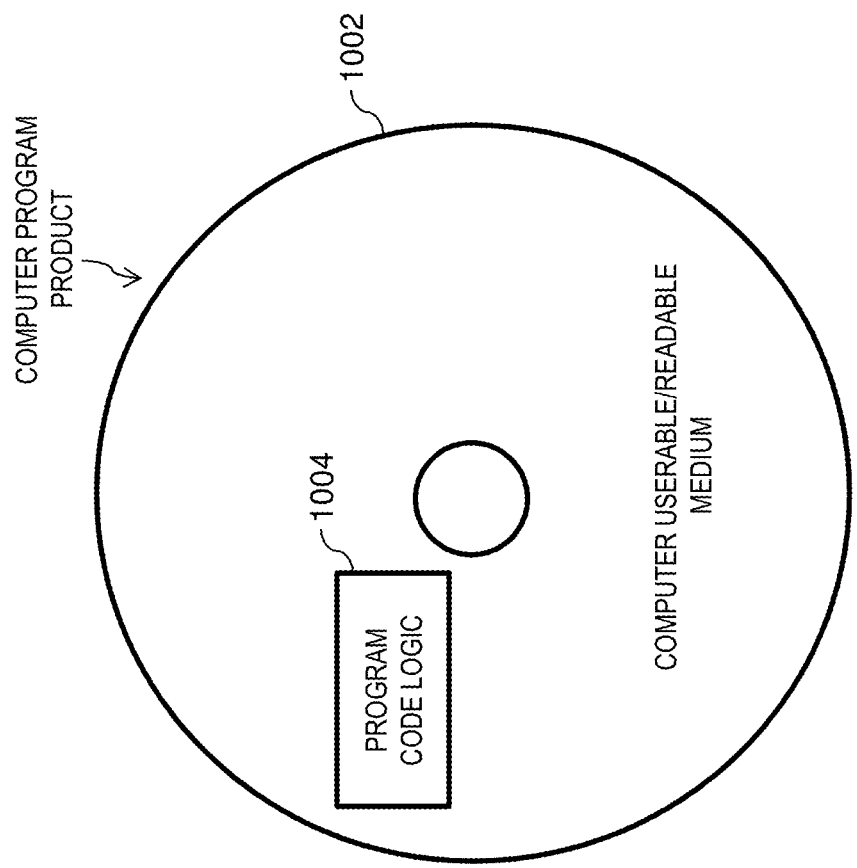

MAKING PRECISE OPERAND-STORE-COMPARE PREDICTIONS TO AVOID FALSE DEPENDENCIES

BACKGROUND

The present invention generally relates to microprocessors, and more specifically to determining precise operand-store-compare (OSC) predictions to avoid false dependencies.

A microprocessor that is capable of issuing and executing machine instructions out of order will in general permit loads to be executed ahead of stores. Two types of hazard events can occur such as a store-hit-load (SHL) event and a load-hit-store (LHS) event. A SHL event occurs when a store instruction to an address is followed by a load instruction directed to the same address. In a one situation, the load instruction can be executed before the store instruction i.e. the store queue does not include the store address information. After the load instruction executes, the store instruction executes and detects the conflict against the finished load instruction in the load queue. This requires the flushing of the instruction pipeline to stop the load instruction and any subsequent instruction, which is a very costly operation since a large amount of operations must be re-performed.

An LHS event occurs when a store instruction executes its address calculation but data for the store instruction is delayed. The store instruction before the data is stored in the store queue. If the load instruction is dependent on the store instruction, the load instruction cannot perform store-data-forwarding because the data is not available. The load instruction must be rejected and re-attempted later after the store data has become available. Conventional mechanisms for managing store-compare hazards generally do not manage these hazards very effectively.

SUMMARY

Embodiments of the invention are directed to a computer-implemented method for determining precise OSC predictions to avoid false dependencies. A non-limiting example of the computer-implemented method includes detecting an instruction causing an OSC event, wherein the OSC event is at least one of a store-hit-load event or a load-hit-store event, and marking an entry in a queue for the instruction based on the detected OSC event, wherein marking the entry comprises setting a bit and saving a tag in the entry in the queue. The computer-implemented method can also include installing an address for the instruction and the tag in the history table responsive to completing the instruction.

Embodiments of the invention are directed to a system for determining precise OSC Predictions to avoid false dependencies. A non-limiting example of the system includes an operand history table (OHT), and a storage medium, the storage medium being coupled to a processor. The processor is configured to detect an instruction causing an OSC event, wherein the OSC event is at least one of a store-hit-load event or a load-hit-store event, and mark an entry in a queue for the instruction based on the detected OSC event, wherein marking the entry comprises setting a bit and saving a tag in the entry in the queue. The processor is further configured to install an address for the instruction and the tag in the history table responsive to completing the instruction.

Embodiments of the invention are directed to a computer program product for determining precise OSC Predictions to avoid false dependencies, the computer program product comprising a computer-readable storage medium having program instructions embodied therewith. The program instructions are executable by a processor to cause the processor to perform a method. A non-limiting example of the method includes detecting an instruction causing an OSC event, wherein the OSC event is at least one of a store-hit-load event or a load-hit-store event, and marking an entry in a queue for the instruction based on the detected OSC event, wherein marking the entry comprises setting a bit and saving a tag in the entry in the queue. The method can also include installing an address for the instruction and the tag in the history table responsive to completing the instruction.

Additional technical features and benefits are realized through the techniques of the invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 9 depicts a system for practicing the techniques described herein in accordance with one or more embodiments of the invention; and FIG. 10 depicts an article of manufacture in accordance with one or more embodiments of the invention.

Figure 1:
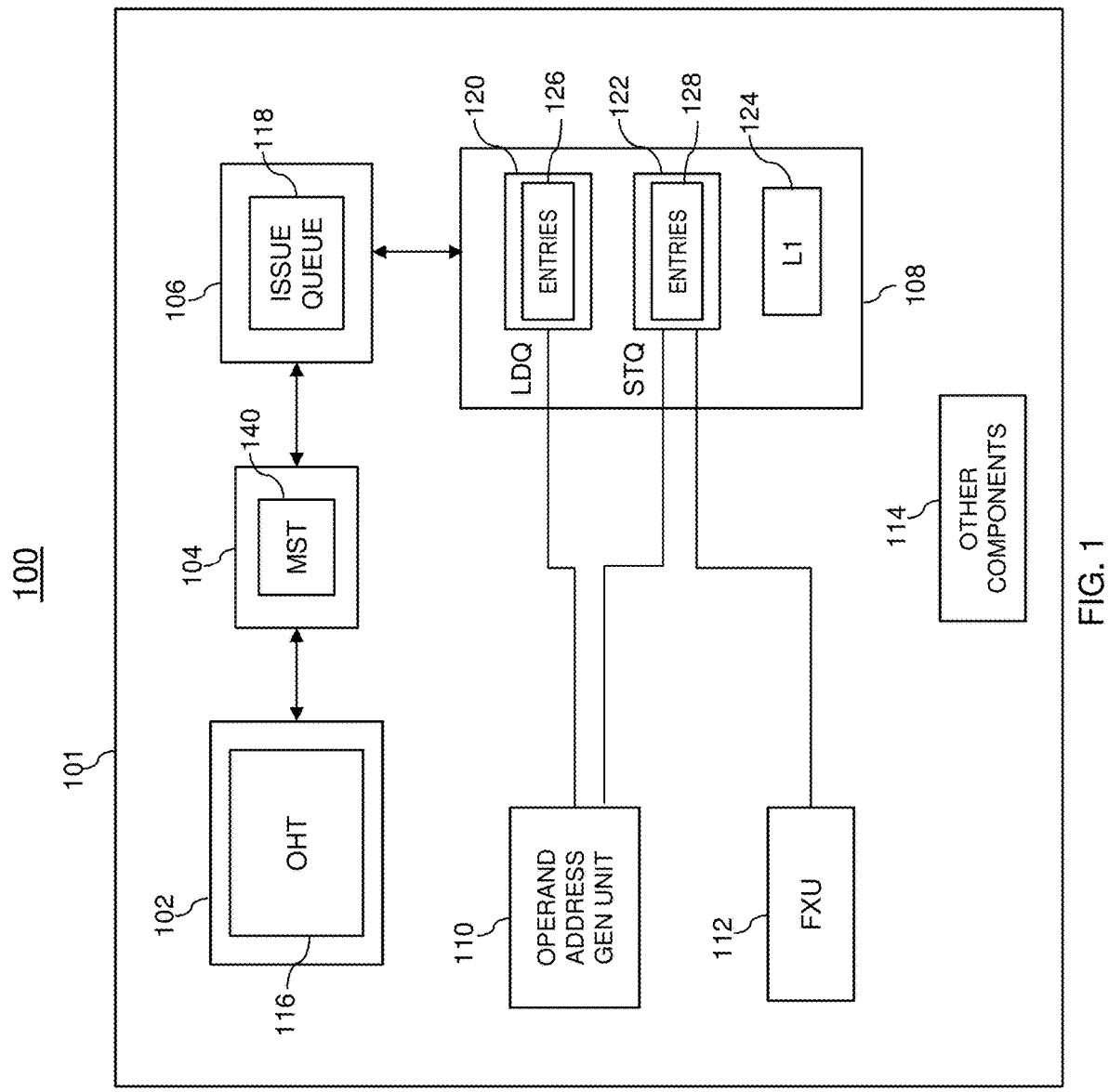
FIG. 1 depicts a system for practicing the teachings described herein.

The diagrams depicted herein are illustrative. There can be many variations to the diagrams or the operations described therein without departing from the spirit of the invention. For instance, the actions can be performed in a differing order or actions can be added, deleted or modified. Also, the term "coupled" and variations thereof describe having a communications path between two elements and do not imply a direct connection between the elements with no intervening elements/connections between them. All of these variations are considered a part of the specification.

In the accompanying figures and following detailed description of the disclosed embodiments, the various elements illustrated in the figures are provided with two or three digit reference numbers. With minor exceptions, the leftmost digit(s) of each reference number correspond to the figure in which its element is first illustrated.

DETAILED DESCRIPTION

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

Turning now to an overview of technologies that is more specifically relevant to aspects of the invention, microprocessors can execute an instruction in a particular sequence. However, if the instructions are executed out-of-sequence various errors or hazards can occur which require flushing the instruction pipeline or further delayed processing. One type of hazard called SHL (Store hit load) occurs when a load instruction executes prior to the store instruction. That is, the load instruction may attempt to operate on wrong data at the memory/cache location that has not been stored yet by the store instruction. This can occur when the issue of the store instruction is delayed because it is waiting for a prior instruction to finish that the store instruction is dependent on, while the load instruction is issued by an out-of-order design after its dependency was all cleared. In this scenario, all instructions after the store instruction are flushed out from the pipeline and start execution again from the store instruction. Another hazard called LSH (Load hit store) occurs when the store and load instructions are issues in-order but the load instruction is issued too early so that the data from the store instruction is not ready for the load instruction. In this scenario, the execution of the load instruction is rejected by LSU and the load instruction in addition to the younger instructions that are dependent on the load instruction need to be re-issued.

Conventional methods for hazard prediction can create false dependencies because a likely-victim load instruction, an instruction that has previously caused an out-of-sequence hazard event, is forced to be dependent on all likely-perp stores in the instruction queue (ISQ). A likely-perp store instruction is a store instruction that was predicted as a potential OSC-perp by the OHT. A likely-victim load instruction is a load instruction that was predicted as a potential OSC-victim by the OHT.

In existing systems, an OHT (Operand history table) is used to predict hazards. The OHT stores the instructions address for the store instructions and the load instructions the previously caused a hazard. Responsive to a subsequent store and load instruction being dispatched, the instruction address is compared to the entries of the OHT.

If a match is detected, any load instruction that is placed in the ISQ is delayed until all of the store instructions in the queue are processed. This reduces the chances that another hazard occurs. However, as previously described the 3:LDy is dependent on 1:STy and the 4:LDx is dependent on 2:STx. This establishes a false dependency. Therefore, by delaying the 3:LDy on both store instructions, the load instruction can be unreasonably delayed since the load instruction is not dependent on the store instruction 2:STx. The techniques that are described herein allow for the identification of the relationships.

These false dependencies can prevent load instructions from being issued until all stores that the load is dependent on finish their execution which limits the number of instructions being executed in parallel. Performance loss due to the false dependencies can be larger than the performance benefit achieved by avoiding hazards (pipeline flushes or rejects) with good dependencies. Larger issue/execution windows that are being used in modern microprocessor systems can cause more false dependencies because with conventional OSC hazard prediction methods the larger issue/execution windows allow for more likely-stores and likely-loads to be available for making OSC dependencies which can further limit its performance.

Turning now to an overview of the aspects of the invention, one or more embodiments of the invention address the above-described shortcomings of the prior art by precisely predicting the dependency of potential OSC-perp store and OSC-victim load instructions using store-tag and load-tag comparisons. The OSC-perp store instruction is a store instruction that previously caused an OSC event is the OSC-perpetrator. The OSC-victim load instruction is a load instruction that previously caused an OSC event is known as the OSC-victim. The techniques described herein saves a store-tag for OSC-victim load instructions and a load-tag for each OSC-perp store responsive to the detection of the OSC event. The OSC-perp store and OSC-victim load are stored in the OHT with the corresponding load tags and store tags. In addition, the likely-perp stores which are predicted by the OHT to cause a hazard are installed into the MST (Marked store table) with their load-tags when the instruction is dispatched. The likely-victim loads are dispatched with the store-tag and compared against all stores in the MST. All likely-perp stores having load-tags that match with the likely-victim's instruction address or its store instruction addresses match with likely-victim store-tags are reported to the ISU and the ISU makes OSC dependencies between the likely-victim load and reported likely-perp stores.

The above-described aspects of the invention address the shortcomings of the prior art by managing the store/load tags and implementing a marked store table to identify dependencies between store and load instructions.

Turning now to a more detailed description of aspects of the invention, FIG. 1 is a block diagram illustrating one example of an operating environment 100 applicable to one or more processes instructions and data in accordance with one or more embodiments of the invention. The processor 101 includes a single integrated circuit processor such as a superscalar processor, which, includes various execution units, registers, buffers, memories, and other functional units that are all formed by integrated circuitry. The processor 101, in one embodiment, is capable of issuing and executing instructions out-of-order.

The processor 101, in one embodiment, includes an instruction fetch unit (IFU) 102, an instruction decode unit (IDU) 104, an instruction issue unit (ISU) 106, a load/store unit (LSU) 108, an operand address generation unit 110, a fixed point unit 112 (or any other execution unit(s)), and other components 114 such as various other execution units, registers, buffers, memories, and other functional units. The IFU 102, in one embodiment, includes an operand-store-compare (OSC) prediction table 116. The OSC prediction table 116 is discussed in greater detail below.

The issue unit 106, in this embodiment, includes an issue queue 118. The LSU 108, in this embodiment, includes a load queue (LDQ) 120, a store queue (STQ) 122, and an L1 cache 124. The LDQ 120 and the STQ 122 each include entries 126, 128, respectively, that track additional information associated with outstanding load and store instructions. It should be noted that various embodiments of the invention are not limited to the configuration of the processor 101 as shown in FIG. 1. In some embodiments of the invention the LDQ 120 and STQ 122 are each configured to store tags which identify corresponding instruction addresses that caused previously hazard events. The embodiments of the invention are applicable to a variety of architectures which can vary from the example shown in FIG. 1.

In general, the IFU 102 fetches instruction codes stored in an I-cache, which can be part of the L1 cache 124. These fetched instruction codes are decoded by the IDU 104 into instruction processing data. In one or more embodiments of the invention, the IDU 104 includes a marked store table (MST) 140. The MST is configured to store information not limited to the store instruction address(es) and corresponding load tag information, where the store instruction addresses are those that were predicted to cause an out-of-order sequence of operations. Once decoded, the instructions are dispatched and temporarily placed in an appropriate issue queue 118. The instructions are held in the issue queue 118 until all their required operands are available. From the issue queue(s) 118, instructions can be issued opportunistically to the execution units, e.g., LSU 108, FXU 112, etc., of the processor 100 for execution. In other words, the instructions can be issued out-of-order. The instructions, however, are maintained in the issue queue(s) 118 until execution of the instructions is complete, and the result data, if any, are written back, in case any of the instructions needs to be reissued.

During execution within one of the execution units an instruction receives operands, if any, from one or more architected and/or rename registers within a register file coupled to the execution unit. After an execution unit finishes execution of an instruction, the execution unit writes the result to the designated destination as specified by the instruction and removes the instruction from the issue queue and the completion of instructions can then be scheduled in program order. The operand address generation unit 110 generates operand address information for load and store instructions and writes these addresses into the respective LDQ 120 and the STQ 122. The FXU 112 writes data values in the STQ 122.

The LSU 108, as discussed above, receives load and store instructions from the ISU 106, and executes the load and store instructions. In general, each load instruction includes address information specifying an address of needed data. In one embodiment, the LSU 108 supports out of order executions of load and store instructions, thereby achieving a high level of performance. In one embodiment, the LSU 108 is pipelined. That is, the LSU 108 executes load and store instructions via a set of ordered pipeline stages performed in sequence.

As discussed above, two types of hazards (store-hit-load and load-hit store) can occur in a processor that executes load and store instructions out-of-order. Therefore, in addition to the general processing mechanisms discussed above with respect to FIG. 1, one or more of the following embodiments can also be implemented within the processor 100 to predict and avoid these OSC hazards.

In general, every Load is allocated an entry in the LDQ 120, which saves the address of each load after it executed until completion. Every Store is allocated an entry in the STQ 122, which similarly saves the store address, from execution of the store address computation until the store completes and has written its data to the L1 cache 124. However, based on the type of hazard detected, an LDQ entry and an STQ entry can also include additional information to predict and avoid OSC hazards.

For example, in one embodiment, the LSU 108 executes a load instruction and compares this load to a corresponding entry in the STQ 122. The load instruction determines that store-data-forwarding cannot be performed. For example, the load is executing prior to the store data being written to the STQ (LHS). The load instruction then sets an OSC hazard bit in the STQ entry it compared against if the load instruction detected an LHS hazard. The load instruction also sets the same OSC hazard bit in its own entry in the LDQ 120. In some processors, the store data can be written into store buffer (STB) instead of the STQ.

When an executed store instruction detects an SHL hazard and performs an SHL flush against an LDQ entry, the store instruction sets an OSC hazard bit in its own STQ entry, and also sets an OSC hazard bit in the (oldest) LDQ entry the instructions compares against. It should be noted that this LDQ entry is invalidated due to the resulting flush, but the OSC hazard bit is retained in the LDQ 120. When the processor pipeline starts re-fetching and re-executing the flushed instructions, the same load is allocated the same LDQ entry, which now has the OSC hazard bit set from before the flush.

Figure 2:
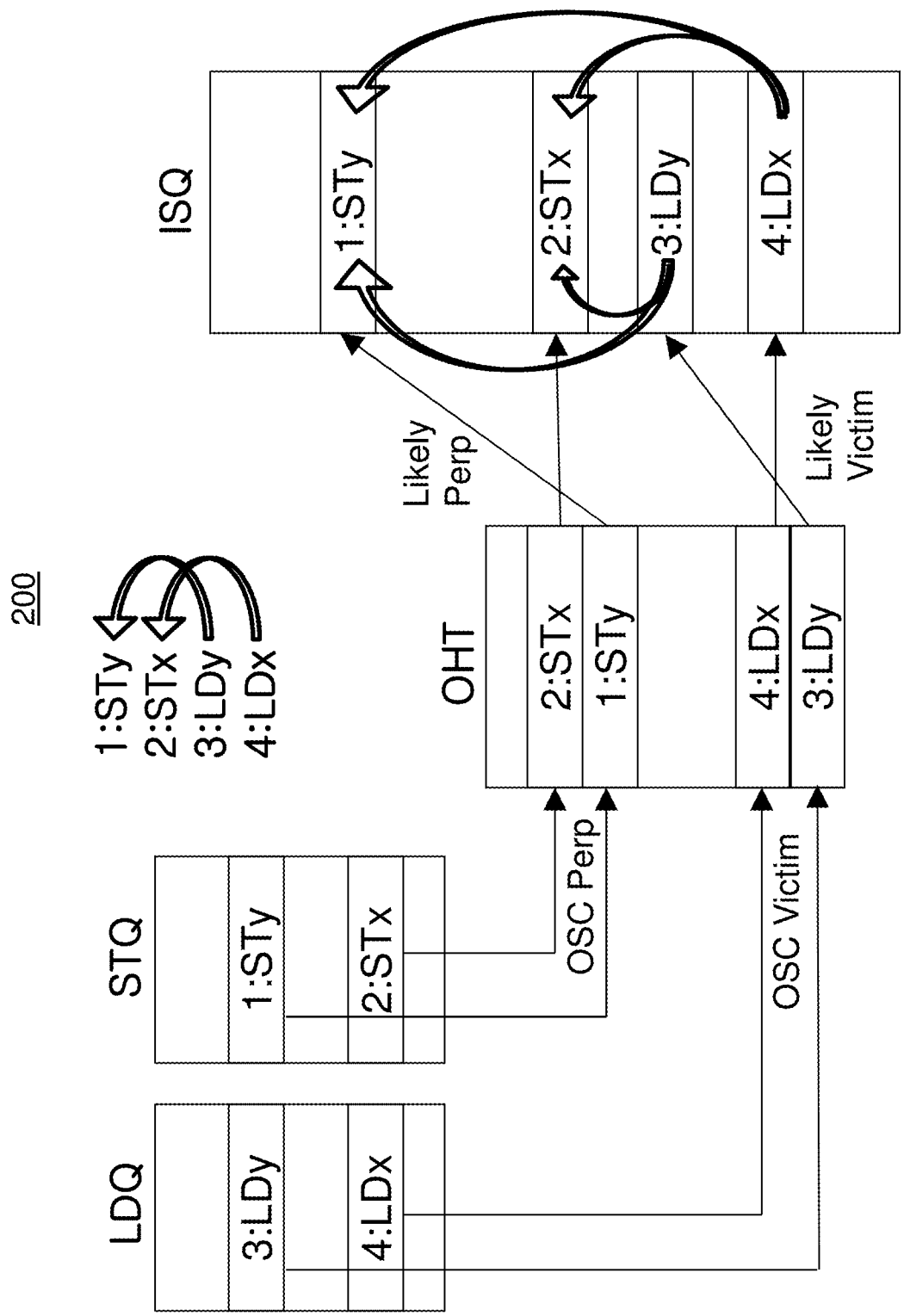
FIG. 2 depicts an existing implementation for performing OSC predictions.

In FIG. 2, a block diagram of a conventional block diagram of a system 200 for predicting OSC hazards is shown. As shown, the STQ includes two store instruction addresses 1:STy and 2:STx and the LDQ stores two load instruction addresses 3:LDy and 4:LDx.

Because the system has previously detected an OSC event, the instructions that were associated with the OSC event are stored in the OHT. The OSC store instruction that caused the OSC hazard is referred to as the OSC perpetrator store (OSC-perp store) instruction, and the load instruction that caused an OSC hazard is referred to as the OSC-victim load (OSC-victim load) instruction.

Responsive to receiving subsequent instructions, whether a store or load instruction, a lookup is performed in the OHT to determine whether an OSC hazard is predicted for the instruction. The store instruction that are predicted to cause a potential OSC-perp store is referred to as the likely-perp store instruction, and the load instruction that was predicted to cause a potential OSC-Victim is referred to as a likely-victim load. If the subsequent instruction is determined to cause an OSC event, the any entry in the ISQ that is a likely-victim load instruction will be delayed until all of the likely-perp store instructions in the ISQ have been executed to avoid the OSC hazard. As shown in the ISQ the load instruction 3:LDy is delayed from execution until both store instruction 1:STy and 2:STx have been executed. This creates false dependency because the load instruction should only be delayed until after 1:STy has executed, not both of the store instruction as shown. This conventional technique does not incorporate the MST and store-tags/load-tags as the embodiments of the invention.

Figure 3:
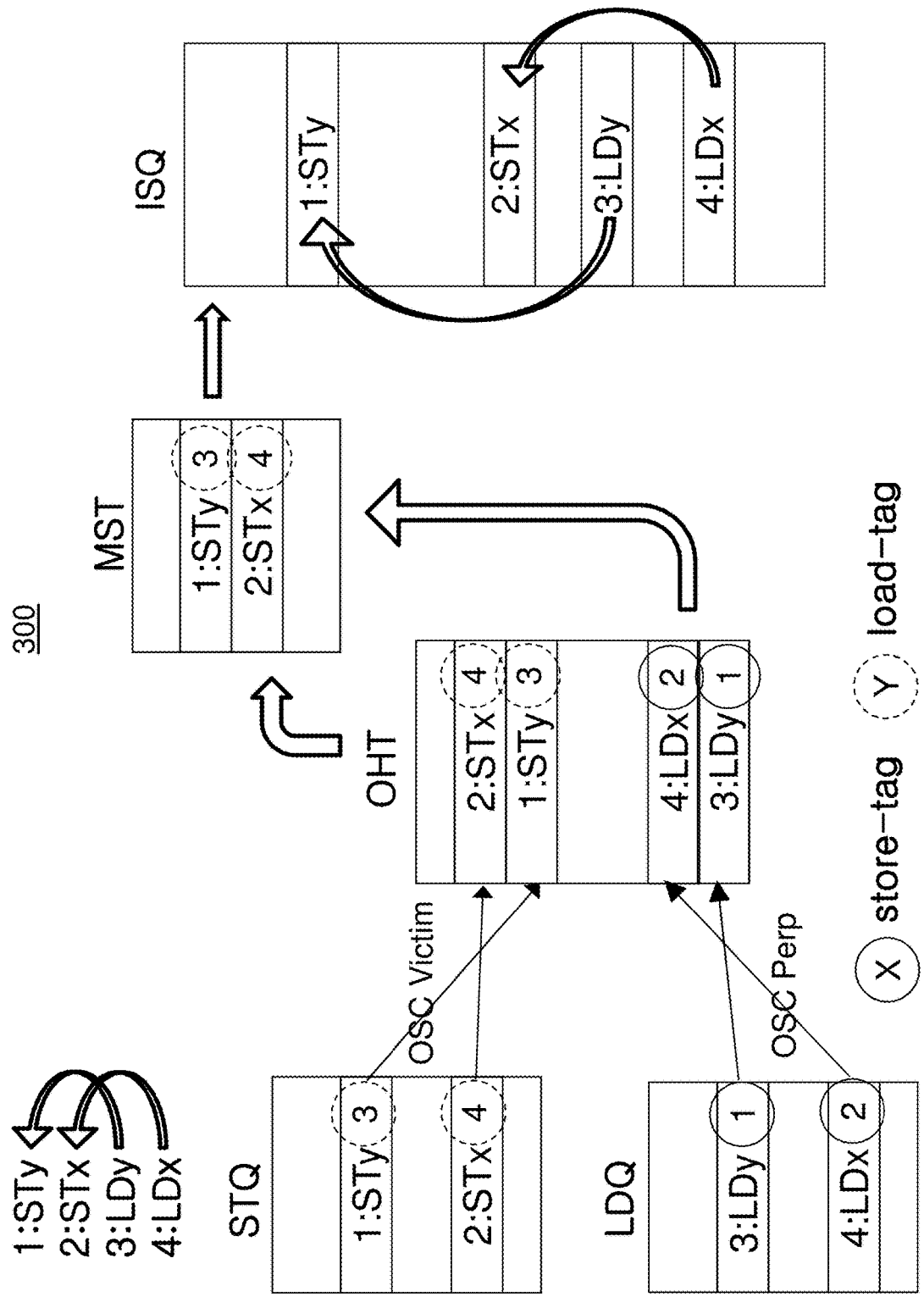
FIG. 3 depicts an example of a system used to determine precise operand-store-compare (OSC) predictions to avoid false dependencies in accordance with one or more embodiments of the invention.

Now referring to FIG. 3, a block diagram of a system 300 in accordance with one or more embodiments of the invention is shown. FIG. 3 depicts a load queue LDQ, store queue STQ, and instruction issue queue ISQ similar to that shown in FIG. 1. As shown, each entry of the store queue STQ is configured to store a load-tag that corresponds to a load instruction that is a OSC-victim load instruction. Similarly, each entry of the load queue LDQ is configured to store a store-tag for the associated store instructions. The relationship between the instruction address and the tag is identified during the hazard. In embodiments of the invention, an OSC hazard bit can be a load-bit or a store-bit. Each LDQ entry can include load-bit indicating OSC-victim load instruction. The techniques described herein now include a store-tag for each entry.

For each detected LHS/SHL event, the load and store instruction are marked. When an SHL occurs (store detected a load in the LDQ), the store instruction causing the SHL is marked as an OSC-perp store instruction with the store bit and load-tag in its STQ entry. In the event a store instruction hits multiple loads, all load instructions are marked as OSC-victim loads with a store-tag which is the store instruction's address, and the store instruction is marked as OSC-perp store instruction with a store-tag which is the address of one of the OSC-victim load instruction. The corresponding load instruction can be selected in a variety of ways that is based on the LDQ design, but the oldest load instruction among all OSC-victim load instructions can be implemented if the LDQ tracks the ages of the LDQ entries.

In the event the LHS occurs (load detected a store in STQ), the load instruction causing the LHS is also marked as OSC-victim with a load-bit and store-tag in its LDQ entry. In the event a load instruction hits multiple store instruction, all stores are marked as OSC-perp store instruction with a load-tag which is the load instruction's address, and the load instruction is marked as an OSC-victim with a store-tag which is the address of one or OSC-perp store instruction. The store instruction can be selected in a variety of ways based on the STQ design, but the youngest store instruction among all of the OSC-perp store instructions can be implemented if the STQ tracks the ages of the STQ entries.

As previously discussed, the OHT is configured to store the store instructions and load instructions that resulted in an OSC event. In one or more embodiments of the invention, the OHT is populated responsive to detecting an OSC hazard. In addition, each entry of the OHT is also configured to store and associate the store-tags and load-tags with each respective entry.

In one or more embodiments of the invention, the MST is located in the IDU 104. The MST contains all likely-perp stores being dispatched and the associated load-tags are also stored, where it is reminded that the likely-perp stores are store instructions that are predicted as a potential OSC-perp by the OHT.

The MST is updated with the store addresses, from the OHT, that were predicted to cause an OSC hazard ("Likely-perp store" instruction) and the associated load-tags. When the MST is updated, the MST stores the likely-perp store instructions in the dispatched ordered based on a FIFO scheme. In some embodiments, the MST will contain n recent likely-perp store instructions, wherein n=total number entries in the MST. When a likely-perp store instruction is installed into the MST, the store instruction address and the load tag are stored for each entry. Responsive to a detecting a likely-victim load at dispatch, a lookup operation is performed in the MST.

For example, when the load instruction 4:LDx is dispatched, a lookup is performed against all MST entries and compares its load address "4" with all load tags in the MST. Then, the store tag "2" is compared with all store instruction addresses in the MST. The process also repeats when load instruction 3:LDy is dispatched. For each likely-victim load, its load address is compared with all load tags, and then, the store tag is compared with all store instruction addresses in the MST.

If a match is determined between the load tag and load instruction address or the store tag and store instruction address, the ISQ is informed of the dependency between the tag and the instruction address and uses the dependency information to control the execution of the instructions.

That is, in one or more embodiments of the invention, the ISU is informed for each load instruction when it is dispatched to the ISQ. The ISQ manages a bit vector where each bit corresponds to each ISQ entry (also referred to as a scoreboard), and sets the bit for the informed store instruction. Therefore, the ISQ will not issue the load instruction until all bits in the scoreboard are cleared. When a store instruction issues, the ISQ resets the corresponding bit in the scoreboard. This technique prevents the load instruction from being issued until all corresponding store instruction the load depends on has issued.

Responsive to the IFU 102 fetching instructions, a lookup is performed in the OHT with the instruction address. For each instruction that is matched in the OHT entry having the store-bit=1, the entry is marked as a likely-perp store. Similarly, each instruction that is matched in the OHT entry having the load-bit=1, the entry is marked as a likely-victim load.

Subsequently, when a likely-perp store is dispatched, it is installed into the MST with its load-tag. Then, when the likely-victim load is dispatched, a look-up is performed in the MST and is compared against all of the likely-perp stores in the MST.

If the store-tag of the likely-victim load matches with the store instruction address of any entry in the MST, the corresponding likely-perp store is reported to the ISU. Also, if the likely-victim load instruction address matches with the load-tag of any MST entry, the corresponding likely-perp store is reported to the ISU 106. All matching likely-perp stores are reported to the ISU. The ISU creates OSC dependencies for the likely-victim load against all likely-perp stores reported from the MST.

Figure 4:
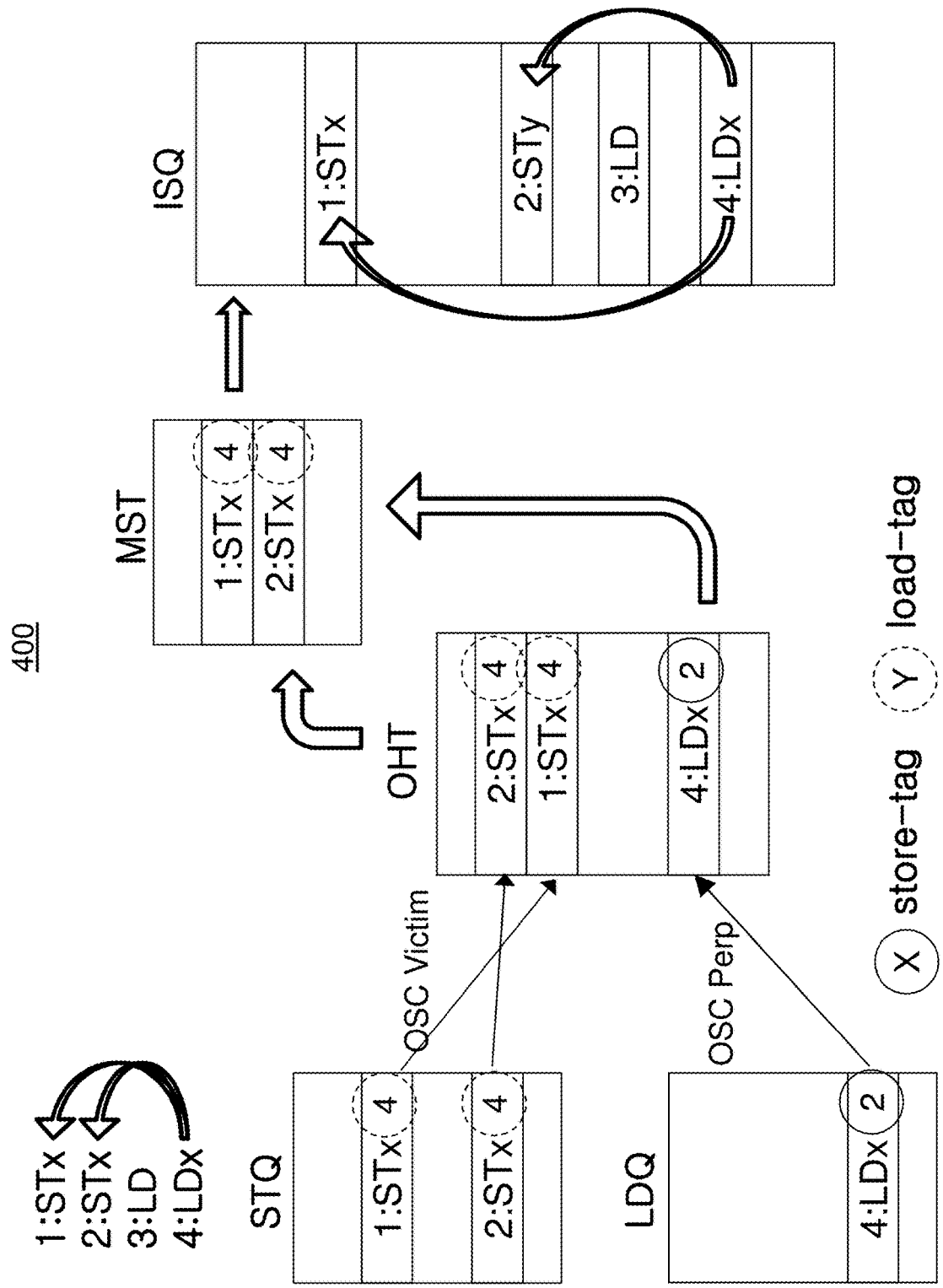
FIG. 4 depicts another example of a system used to determine precise operand-store-compare (OSC) predictions to avoid false dependencies in accordance with one or more embodiments of the invention.

Now referring to FIG. 4, another embodiment of a system 400 for implementing the techniques described herein is provided. Similar to FIG. 3, the implementation includes the store queue STQ, load queue LDQ, and instruction issue queue ISQ. In addition, the OHT and MST are used to store the tag information and are used to determine to identify specific dependencies between the store instructions and load instructions.

In some embodiments, a one-to-many relationship among store and load instructions is determined. In addition to storing the store instruction addresses, each entry of the STQ is also configured to store load-tags for the associated load-instructions. In this example, the load instruction 4:LDx is determined to be associated with multiple store instructions 1:STx and 2:STx responsive to detecting a previous OSC hazard. Therefore, the store instructions are associated with the load-tag of the offending load instruction "4". In addition, the load instruction also includes the store-tag of at least one of the associated store instruction addresses "2".

The OHT as shown stores both the tags and instruction addresses detected to have caused a previous OSC event. The MST is updated and populated with each store instruction and its corresponding tag that is predicted to have caused the OSC event. When a load instruction is dispatched it is compared to the OHT and further compared to the MST to identify between the load instruction and the store instruction. In this instance a one-to-many dependency is determined. In other words, if only the store tag for the likely-victim load is used, there would only be one match in the MST entry 2:STx. Now that the load tags are implemented in the MST, precise prediction can be made between the store and load instructions.

Figure 5:
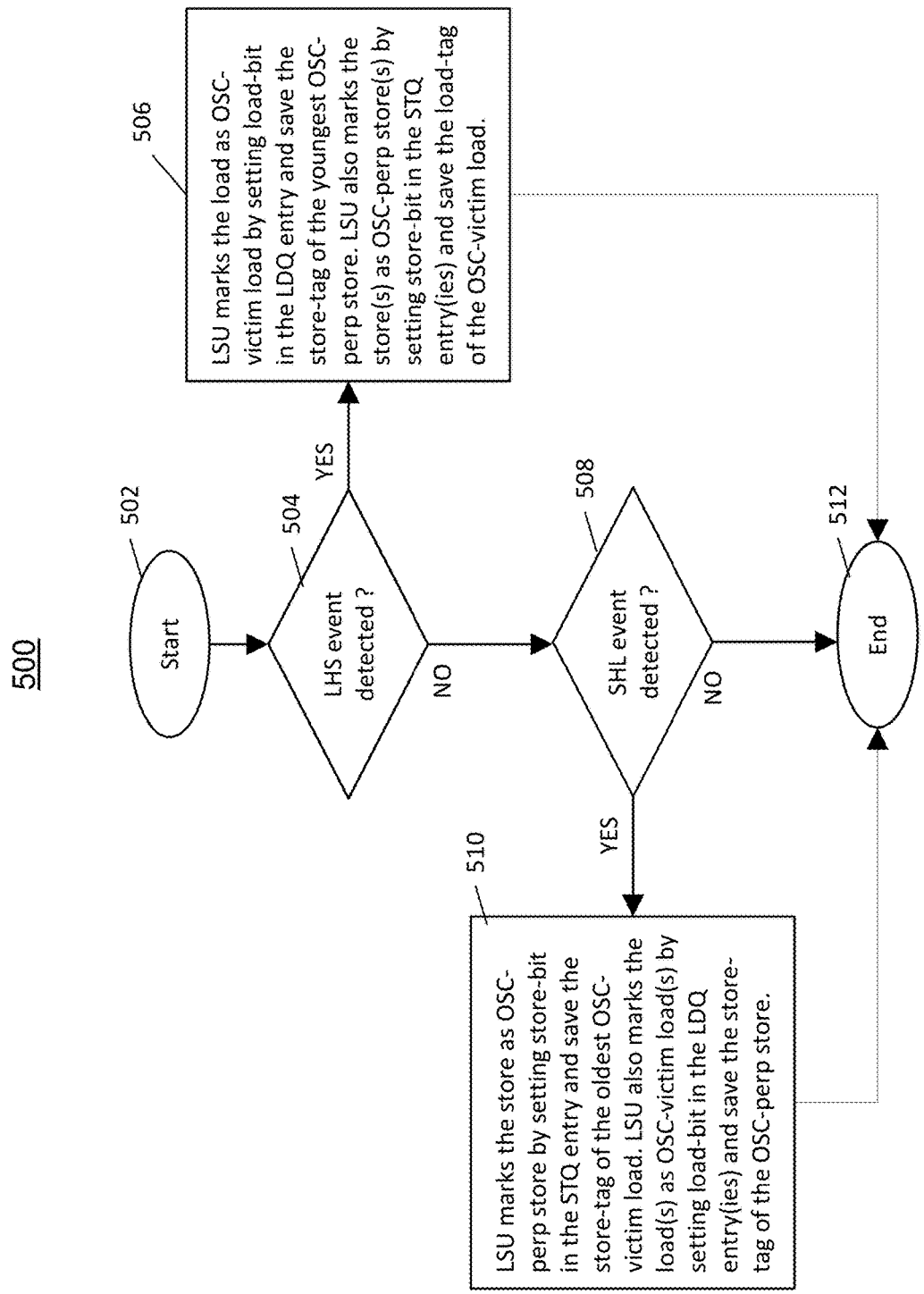
FIG. 5 depicts a flowchart for an OSC event detection process in accordance with one or more embodiments of the invention.

Now referring to FIG. 5, a flowchart of a process 500 for detecting and marking entries in the LDQ and STQ in accordance with one or more embodiments of the invention is shown. The process begins at block 502 to determine if an OSC event has been detected and continues to decision block 504 which determines whether an LHS event is detected. If the LHS event is detected ("Yes" branch), the process 500 continues to block 506 where the LSU marks the load instruction as the OSC-victim load by setting a load-bit in the LDQ entry and saves the store-tag of the youngest OSC-perp store instruction. The LSU also marks the store instruction(s) as OSC-perp store instruction(s) by setting a store-bit in the STQ entry(ies) and save the load-tag of the OSC-victim load instruction. The process 500 ends at block 512.

If at block 504 the LHS event is not detected ("No" branch), the process 500 continues to the decision block 508 to determine whether an SHL event has been detected. If the SHL event is detected ("Yes" branch), the process 500 continues to block 510 which provides for the LSU marking the store. The LSU marks the store instruction as an OSC-perp store instruction by setting the store-bit in the STQ entry and save the store-tag of the oldest OSC-victim load. The LSU also marks the load instruction(s) as OSC-victim load instruction(s) by setting the load-bit in the LDQ entry(ies) and saves the store-tag of the OSC-perp store instruction. The process 500 continues to block 512 and ends. If at block 508 the SHL event is not detected, the process 500 ends at block 512.

Figure 6:
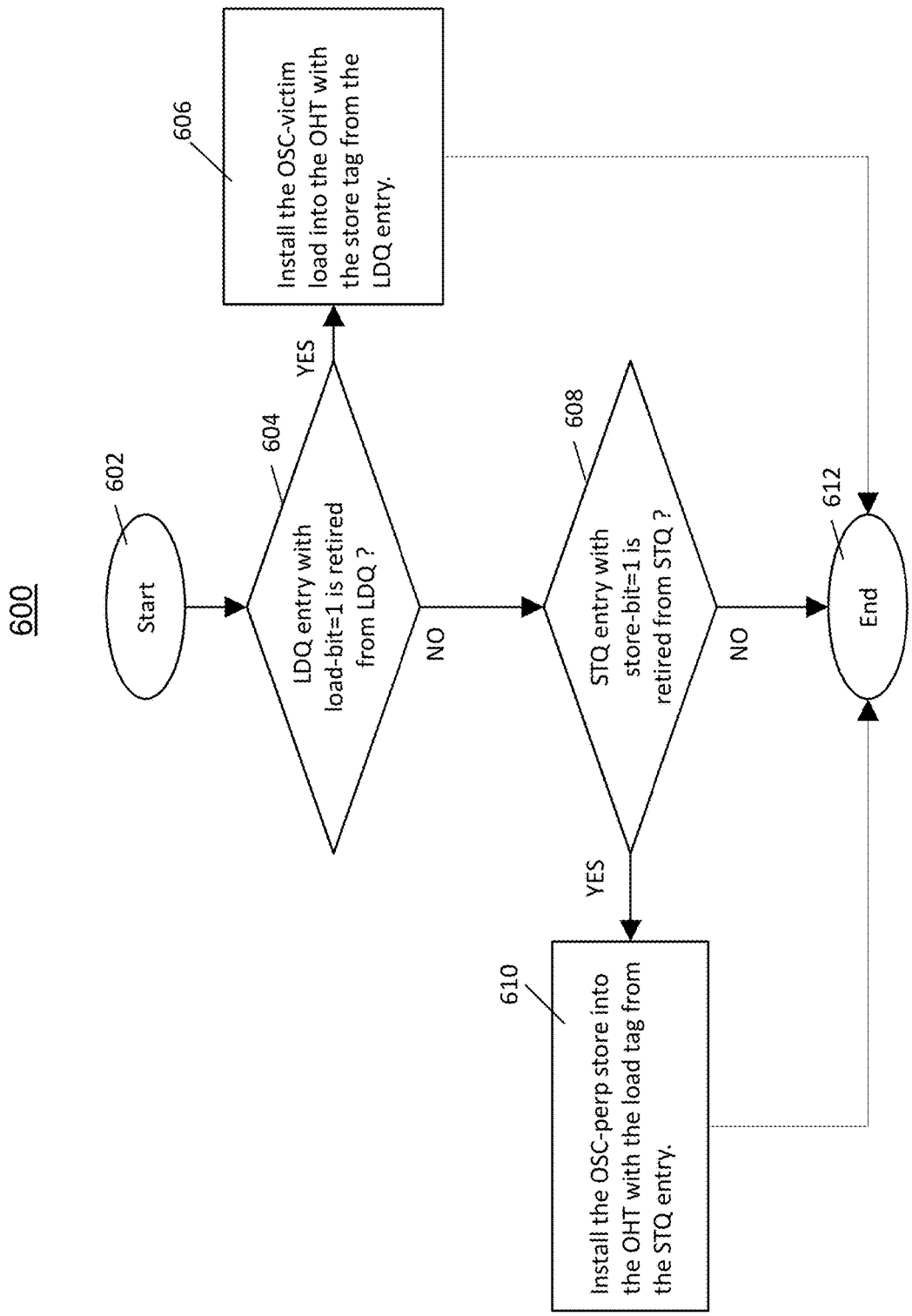
FIG. 6 depicts a flowchart for an instruction completion process in accordance with one or more embodiments of the invention.

Now referring to FIG. 6, a process 600 for installing entries in the history table in accordance with one or more embodiments is shown.

At block 604, the process 600 determines whether an LDQ entry with a load-bit=1 is retired from the LDQ. If so ("Yes" branch), the process 600 proceeds to block 606 and installs the OSC-victim load into the OHT with the store tag from the LDQ entry. Otherwise ("No" branch), the process 600 continues to block 608 and it is determined whether the STQ entry with store-bit=1 is retired from STQ. If so ("Yes" branch), at block 610 the process 600 installs the OSC-perp store into the OHT with the load tag from the STQ entry. If not ("No" branch), the process 600 ends at block 612.

Figure 7:
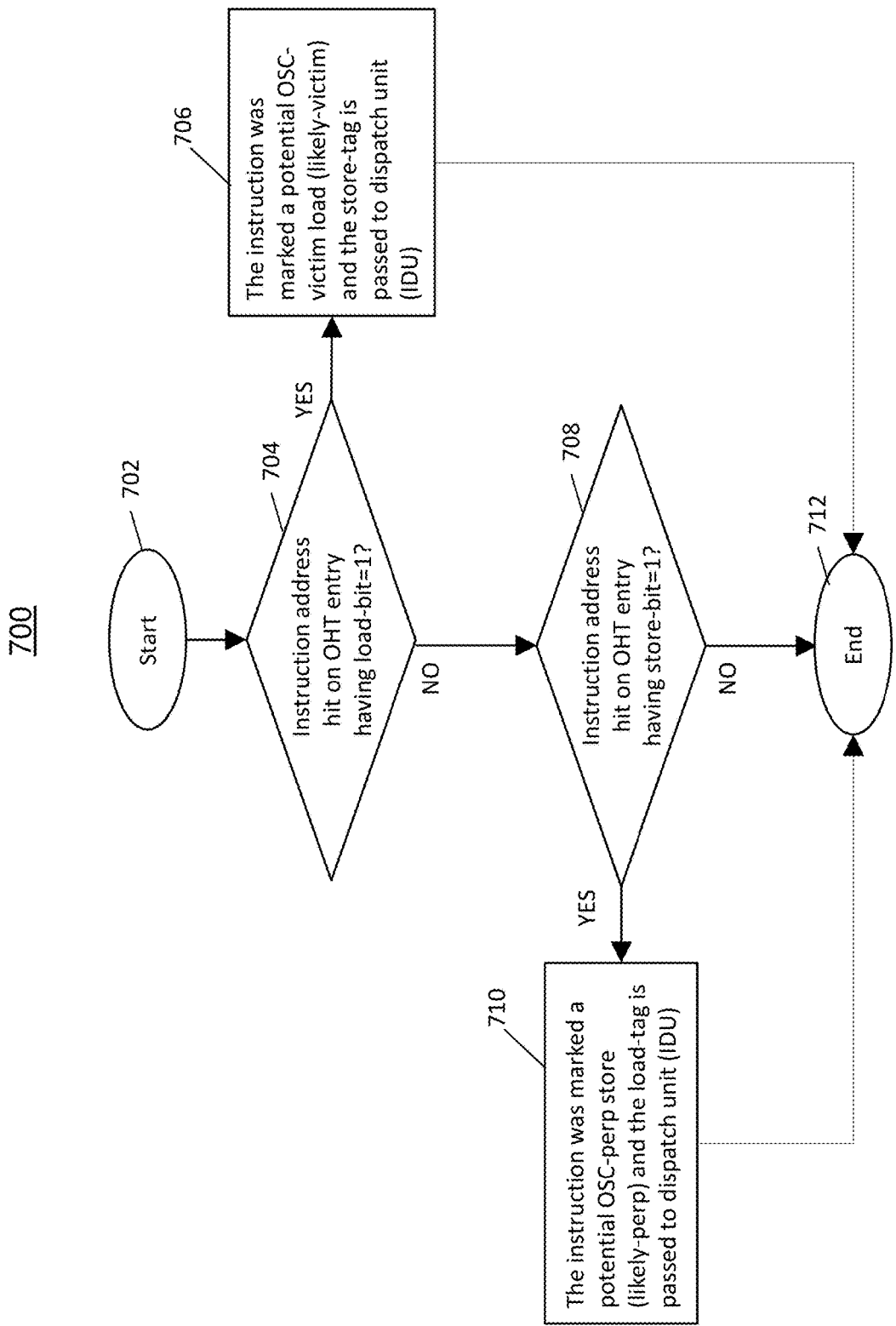
FIG. 7 depicts a flowchart for an OSC prediction process in accordance with one or more embodiments of the invention.

Now referring to FIG. 7, the process 700 for predicting OSC events in accordance with one or more embodiments of the invention. The process 700 begins at block 702 and continues to block 704 which determines whether the instruction address hit an OHT entry having a load-bit=1. If it is determined the entry matches ("Yes" branch), the process 700 proceeds to block 706 which provides the instruction was marked a potential OSC-victim load (likely-victim) and the store-tag is passed to the dispatch unit (IDU). Otherwise ("No" branch), the process 700 continues to block 708 to determine whether the instruction address hit on an OHT entry having store-bit=1. If so ("Yes" branch) the process 700 continues to block 710 where the instruction is marked a potential OSC-perp store (likely-perp) and the load-tag is passed to the dispatch unit (IDU). Otherwise ("No" branch), the process ends at block 712.

Figure 8:
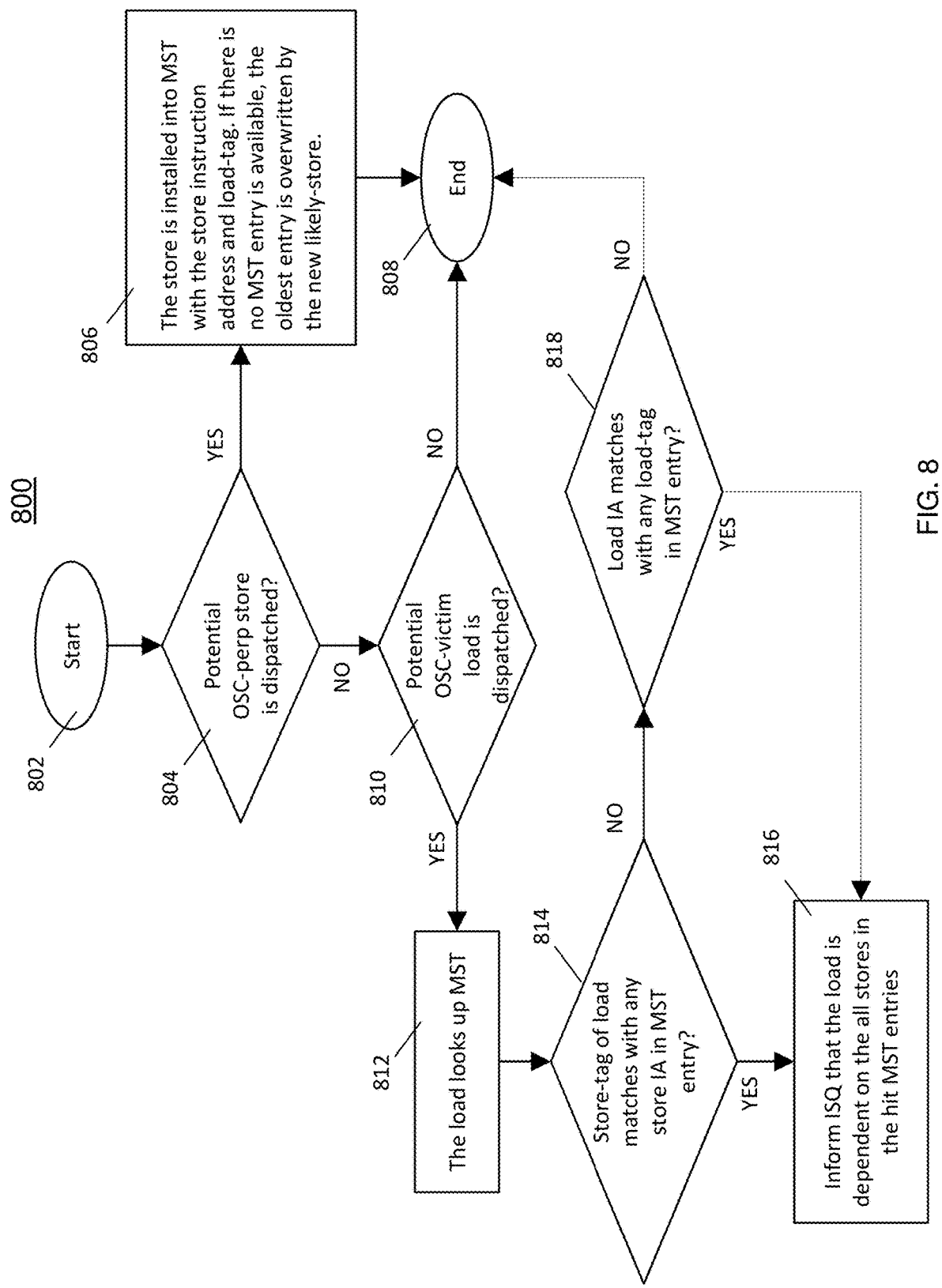
FIG. 8 depicts a flowchart for a dispatch process in accordance with one or more embodiments of the invention.

FIG. 8 depicts a process 800 for identifying OSC dependencies in accordance with one or more embodiments. The process 800 starts at block 802. At block 804, it is determined whether a potential OSC-perp-store is dispatched. If it is determined ("Yes" branch) that a potential OSC-perp store instruction has been dispatched, the process 800 continues to block 806 where the store is installed into the MST with the store instruction address and load tag. In one or more embodiments of the invention, if there is no MST entry available, the oldest MST entry is overwritten by the new likely-store.

If at block 804, it is determined that no OSC-perp store instruction has been dispatched ("No" branch), the process continues to block 810 which determines whether a potential OSC-victim load is dispatched.

If so ("Yes" branch), the load is looked up in the MST at block 812. Next the process 800 continues to block 814 where it is determined whether the store-tag of the load instruction matches with any store instruction address in an MST entry. If so ("Yes" branch), the process 800 continues to block 816 and the ISQ is informed that the load is dependent on the all stores in the hit MST entries. Otherwise ("No" branch), the process 800 continues to block 818 to determine whether the load instruction address matches with any load-tag in the MST entry. If so ("Yes" branch) the process continues to block 816. Otherwise ("No" branch), the process continues to block 808 where the process 800 ends.

FIG. 9 is a block diagram illustrating a detailed view an information processing system 900 according to one embodiment of the invention. The information processing system 900 is based upon a suitably configured processing system adapted to implement one or more embodiments of the invention. Any suitably configured processing system is similarly able to be used as the information processing system 900 by embodiments of the invention.

The information processing system 900 includes a computer 902. The computer 902 has a processor(s) 101 such as the processor of FIG. 1. The processor 101 includes the IFU 102 including the OSC prediction table 116; the IDU 104; the ISU 106 comprising the issue queue 118; the LSU 108 comprising the LDQ 120, the STQ 122, and the L1 cache 124; the operand address generating unit 110, the FXU 112, and various other components 114, as shown in FIG. 1.

The processor 101 is connected to a main memory 906, mass storage interface 908, and network adapter hardware 910. A system bus 912 interconnects these system components. The mass storage interface 908 is used to connect mass storage devices, such as data storage device 914, to the information processing system 900. One specific type of data storage device is an optical drive such as a CD/DVD drive, which may be used to store data to and read data from a computer-readable medium or storage product such as (but not limited to) a CD/DVD 916. Another type of data storage device is a data storage device configured to support, for example, file system operations.

In one embodiment, the information processing system 900 utilizes conventional virtual addressing mechanisms to allow programs to behave as if they have access to a large, single storage entity, referred to herein as a computer system memory, instead of access to multiple, smaller storage entities such as the main memory 906 and data storage device 916. Note that the term "computer system memory" is used herein to generically refer to the entire virtual memory of the information processing system 900.

Although only one processor 101 is illustrated for computer 902, computer systems with multiple processors can be used equally effectively. Various embodiments of the invention further incorporate interfaces that each includes separate, fully programmed microprocessors that are used to off-load processing from the processor 101. An operating system (not shown) included in the main memory is a suitable multitasking operating system such as, and not for limitation, the GNU/Linux, AIX, Solaris, and HP-UX. Various embodiments of the invention are able to use any other suitable operating system. Some embodiments of the invention utilize architectures, such as an object oriented framework mechanism, that allow instructions of the components of operating system (not shown) to be executed on any processor located within the information processing system 900. The network adapter hardware 910 is used to provide an interface to one or more networks 918. Various embodiments of the invention are able to be adapted to work with any data communications connections including present day analog and/or digital techniques or via a future networking mechanism.

Although the exemplary embodiments of the invention are described in the context of a fully functional computer system, those skilled in the art will appreciate that embodiments are capable of being distributed as a program product via CD or DVD, e.g. CD 616, CD ROM, or other form of recordable media, or via any type of electronic transmission mechanism.

Referring now to FIG. 10, a computer program product 1000 in accordance with an embodiment that includes a computer-readable storage medium 1002 and program instructions 1004 is generally shown.

The techniques described herein improve over the prior art by avoiding the generation of false dependencies. By implementing a store-tag and load-tag with instructions and performing load instructions and the store instructions respectively to identify dependencies. This reduces the latency and improves processing efficiencies using the specific identified positions.

Since the one-to-one correspondence is determined, the load instructions are no longer required to wait until each and every store instruction is executed before it can be executed. The load instruction can be executed as soon the corresponding store instruction is executed which results in processing delay improvements and efficiencies. Using predetermined delays among unrelated store and load instructions is no longer required.

The invention may be a system, a method, and/or a computer program product at any possible technical detail level of integration. The computer program product may include a computer-readable storage medium (or media) having computer-readable program instructions thereon for causing a processor to carry out aspects of the invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may include copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instruction by utilizing state information of the computer-readable program instructions to personalize the electronic circuitry, in order to perform aspects of the invention.

Aspects of the invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein includes an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the invention. In this regard, each block in the flowchart or block diagrams may represent a module, segment, or portion of instructions, which includes one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for determining precise operand-store-compare (OSC) predictions to avoid false dependencies, the computer-implemented method comprising:

detecting an instruction causing an OSC event, wherein the OSC event is at least one of a store-hit-load event or a load-hit-store event;

marking an entry in a queue for the instruction based on the detected OSC event, wherein marking the entry comprises setting a bit and saving a tag in the entry in the queue;

installing an address for the instruction and the tag in a history table responsive to completing the instruction; and responsive to dispatching a potential OSC-victim load instruction, performing a lookup in a marked store table (MST), wherein the potential OSC-victim load instruction is a load instruction that was previously predicted as an OSC-victim load instruction, wherein performing the MST lookup is based on a load-bit that is set in the history table indicating the subsequent instruction is a victim load instruction of a previous OSC event.

2. The computer-implemented method of claim 1, further comprising:

performing a prediction for a subsequent instruction;

identifying at least one of a potential OSC-victim load and store-tag or potential OSC-perp store and load-tag based on the subsequent instruction; and performing a lookup in the history table for the subsequent instruction.

3. The computer-implemented method of claim 1, further comprising:

responsive to dispatching a potential OSC-perp store instruction, installing the store instruction and load tag into a marked store table (MST), wherein the potential OSC-perp instruction is a store instruction that was previously predicted as an OSC-perp store instruction in the history table.

4. The computer-implemented method of claim 3, further comprising:

when installing the store instruction and load-tag, determining if an entry is available in the MST; and overwriting an oldest entry in the MST based on the determination.

5. The computer-implemented method of claim 1, wherein performing the MST lookup comprises:
comparing the store-tag of the load instruction with store instruction addresses in the MST;
determining a dependency between the load instruction and the store instruction based on the comparison; and
providing the dependency to an instruction queue.

6. The computer-implemented method of claim 5, further comprising:
based on the comparison, further comparing a load instruction address of the load instruction with load-tags in the MST;
determining the dependency on the load-tag and stores; and
providing the dependency to an instruction queue.

7. A system for determining precise operand-store-compare (OSC) predictions to avoid false dependencies, the system comprising:
a history table (OHT); and
a storage medium, the storage medium being coupled to a processor;
the processor configured to:
detect an instruction causing an OSC event, wherein the OSC event is at least one of a store-hit-load event or a load-hit-store event;
mark an entry in a queue for the instruction based on the detected OSC event, wherein marking the entry comprises setting a bit and saving a tag in the entry in the queue;
install an address for the instruction and the tag in the history table responsive to completing the instruction; and
perform a lookup in a marked store table (MST), responsive to dispatching a potential OSC-victim load instruction, wherein the potential OSC-victim load instruction is a load instruction that was previously predicted as an OSC-victim load instruction, wherein performing the MST lookup is based on a load-bit that is set in the history table indicating the subsequent instruction is a victim load instruction of a previous OSC event.

8. The system of claim 7, wherein the processor is configured to:
perform a prediction for a subsequent instruction;
identify at least one of a potential OSC-victim load and store-tag or a potential OSC-perp store and load-tag based on the subsequent instruction; and
perform a lookup in the history table for the subsequent instruction.

9. The system of claim 7, wherein the processor is configured to:
install the store instruction and load tag into a marked store table (MST), responsive to dispatching a potential OSC-perp store instruction, wherein the potential OSC-perp instruction is a store instruction that was previously predicted as an OSC-perp store instruction in the history table.

10. The system of claim 9, wherein the processor is further configured to:
install the store instruction and load-tag, determining if an entry is available in the MST; and
overwrite an oldest entry in the MST based on the determination.

11. The system of claim 7, wherein, when performing the MST lookup, the processor is configured to:
compare the store-tag of the load instruction with store instruction addresses in the MST;
determine a dependency between the load instruction and the store instruction based on the comparison; and
provide the dependency to an instruction queue.

12. The system of claim 11, wherein based on the comparison, the processor is configured to:
compare the load instruction address of the load instruction with load-tags in the MST;
determine the dependency on the load-tag and stores; and
provide the dependency to an instruction queue.

13. A computer program product for determining precise operand-store-compare (OSC) predictions to avoid false dependencies, the computer program product comprising a computer-readable storage medium having program instructions embodied therewith, the program instructions executable by a processor to cause the processor to:
detect an instruction causing an OSC event, wherein the OSC event is at least one of a store-hit-load event or a load-hit-store event;
mark an entry in a queue for the instruction based on the detected OSC event, wherein marking the entry comprises setting a bit and saving a tag in the entry in the queue;
install an address for the instruction and the tag in a history table responsive to completing the instruction; and
responsive to dispatching a potential OSC-victim load instruction, perform a lookup in a marked store table (MST), wherein the potential OSC-victim load instruction is a load instruction that was previously predicted as an OSC-victim load instruction, wherein performing the MST lookup is based on a load-bit that is set in the history table indicating the subsequent instruction is a victim load instruction of a previous OSC event.

14. The computer program product of claim 13, wherein the instructions are further executable by the processor to cause the processor to:
perform a prediction for a subsequent instruction;
identify at least one of a potential OSC-victim load and store-tag or a potential OSC-perp store and load-tag based on the subsequent instruction; and
perform a lookup in the history table for the subsequent instruction.

15. The computer program product of claim 13, wherein the instructions are further executable by the processor to cause the processor to:
install the store instruction and load tag into a marked store table (MST), responsive to dispatching a potential OSC-perp store instruction, wherein the potential OSC-perp instruction is a store instruction that was previously predicted as an OSC-perp store instruction in the history table.

16. The computer program product of claim 15, wherein the instructions are further executable by the processor to cause the processor to:
install the store instruction and load-tag, determining if an entry is available in the MST; and
overwrite an oldest entry in the MST based on the determination.

17. The computer program product of claim 13, wherein the instructions are further executable by the processor to cause the processor to:
perform a lookup in a marked store table (MST), responsive to dispatching a potential OSC-victim load instruction, wherein the potential OSC-victim load instruction is a load instruction that was previously predicted as an OSC-victim load instruction.

18. The computer program product of claim 17, wherein, when performing the MST lookup, the instructions are further executable by the processor to cause the processor to:
    compare the store-tag of the load instruction with store instruction addresses in the MST;
    determine a dependency between the load instruction and the store instruction based on the comparison; and
    provide the dependency to an instruction queue.

19. The computer program product of claim 18, wherein based on the comparison, the instructions are further executable by the processor to cause the processor to:
    compare the load instruction address of the load instruction with load-tags in the MST;
    determine the dependency on the load-tag and stores; and
    provide the dependency to an instruction queue.

* * * * *